United States Patent [19]

Jackson

[11] 3,738,679
[45] June 12, 1973

[54] AUXILIARY RETRACTION ASSEMBLY FOR PNEUMATICALLY SUSPENDED TANDEM-AXLE TYPES

[76] Inventor: William E. Jackson, 3726 Ernst Street, Omaha, Nebr. 68112

[22] Filed: May 15, 1972

[21] Appl. No.: 253,291

[52] U.S. Cl. ......................... 280/124 R, 180/24.02
[51] Int. Cl. ............................................ B60g 11/46
[58] Field of Search .............. 280/124 R; 180/22 D, 180/22 E, 24.02

[56] References Cited
UNITED STATES PATENTS

| | | | |
|---|---|---|---|
| 3,532,357 | 10/1970 | Williams | 280/124 R |
| 3,484,091 | 12/1969 | Draves | 280/124 R |
| 3,093,388 | 6/1963 | Kulyk | 180/22 D |

*Primary Examiner*—Philip Goodman
*Attorney*—George R. Nimmer

[57] ABSTRACT

For overland drayage vehicles having one or more pneumatically suspended tandem-axles (traditionally comprising a fulcrum supported beam and air-bellows), there is provided an auxiliary retraction assembly that automatically raises the tandem-axle wheels from the underlying substrate whenever the vehicle operator (during periods of reduced cargo) purposely reduces the air-bellows pressure. Preferred embodiments of the auxiliary retraction assembly comprise: an elongate leaf-spring including a restrained-length portion maintained as through a novel bracket at constant elevation and also including a flexural-length portion terminating remote from the restrained-length between the beam fulcrum and the air-bellows, and an upright connector such as a novel pivotal link actuatably extending from the leaf-spring flexural-length to the tandem-axle whereby the leaf-spring flexural-length becomes progressively lower as the air-bellows is inflated and becomes progressively higher as the air-bellows is purposely deflated whereupon a finite spatial gap is created between the tandem-axle wheels and the underlying substrate.

8 Claims, 3 Drawing Figures

AUXILIARY RETRACTION ASSEMBLY FOR PNEUMATICALLY SUSPENDED TANDEM-AXLE TYPES

Drayage trucks and other overland cargo bearing vehicles are oftentimes discretionally provided with one or more additional transversely extending axles having rotatable wheels attached thereto. It is the primary purpose of such additional axles, which are oftentimes referred to as tandem-axles, to more evenly distribute the cargo weight along the vehicle frame lengthwise-axis. The most prevalent type of tandem-axle is the traditional "pneumatically suspended beam" which, on each lateral side of the vehicle lengthwise-axis, generally comprises: an elongate longitudinally extending beam (either rigid or springy), a beam medial portion being attached to the tandem-axle; the beam relatively forward leading portion is in fulcrum relationship to a hanger depending from the frame whereby the gravitational-force comprising the weight of the tandem-axle and the attached wheels causes the beam to rotate about the fulcrum whereupon the wheels actually contact the roadway or other underlying substrate; and an inflatable air-bellows (sometimes referred to as an "airspring") usually located directionally rearwardly of the hanger and suspended from the vehicle frame, said air-bellows when controllably inflated being adapted to press downwardly upon the beam trailing rearward portion whereby the pressure between the tandem-axle wheels and the underlying substrate can be controlled. Thus, for cargo weighted vehicles, such pneumatically suspended tandem-axles have the desireable capability of forcing the several longitudinally spaced wheels in constant pressure against the underlying substrate. In addition to the air-bellows, and for the additional purpose of providing axle-to-frame cushioning means, there might also be included shocks, leaf-springs, a spring-beam, etc., which for cushioning purposes extends between the tandem-axle and the vehicle frame.

Oftentimes vehicles having the pneumatically suspended tandem-axles are operated for short durations substantially devoid of cargo, such as a truck returning to a quarry after having delivered a load of gravel. For such vehicle trips involving reduced or non-existent cargo, wear on those rubber tire wheels associated with the tandem-axles could be reduced if they were upwardly retracted so as to not contact the road-way underlying substrate. Relatively sophisticated pneumatically suspended tandem-axles of recent vintage have incorporated thereinto structural features that are intended to automatically upwardly withdraw (or retract) the tandem-axle tires from contacting the underlying substrate during periods of reduced cargo loads. However, most of these recently developed tandem-axle retractors have necessitated radical and cumbersome modifications to the traditional simple structure for pneumatically suspended tandem-axles. Moreover, these recently developed tandem-axle retractors are available primarily in relatively expensive original equipment form. Accordingly, for those great many vehicles which have for years been equipped with traditional non-retractable forms of pneumatically suspended tandem-axles, tandem-axle retractability would involve the expense of discarding the existent equipment.

It is accordingly the general object of the present invention to provide an improved retraction means for automatically lifting tandem-axles of the pneumatically suspended class and to be effective whenever the vehicle operator wishes to have the tandem-axle tire wheels raised from the underlying substrate during periods of reduced cargo load.

It is a further object of the present invention to provide for pneumatically suspended tandem-axles a retraction or lifting means that automatically raises the tandem-axle tires from the ground whenever the air-bellows pressure is substantially purposely reduced. It is an ancillary object to have the retraction means become effective automatically and without requiring specific attention accessory the operator whenever he purposely decreases the air-bellows inflation pressure.

It is another object of the present invention to provide an auxiliary retractor assembly that is amenable for use with several styles of the traditional pneumatically suspended tandem-axle, both as original equipment form and as an addendum accessory for older existent equipment. In the latter regard, the auxiliary retraction assembly is versatilely applicable as an axxessory to diverse kinds of vehicle frame environments and without involving any appreciable deletion, substitution, or modification of the already existent traditional pneumatically suspended tandem-axle.

With the above and other objects and advantages in view, which will become more apparent as this description proceeds, the auxiliary retraction assembly generally comprises an elongate leaf-spring (which is wholly distinct from any axle-to-frame cushioning means included within the pneumatically suspended tandem-axle), said elongate leaf-spring lying generally parallel to the beam and having an overall length on the order of about less than one-half compared to the beam overall length, said leaf-apring longitudinally extending length including a restrained-length permanently maintained at a constant elevation and preferably below the beam fulcrum and also including a flexural-length that is forced to become progressively lowered as the air-bellows is progressively inflated, the leaf-spring free-end being located between the air-bellows and the beam-fulcrum and being actuatably connected through an uprightable connector such as a pivotal link to the medially disposed tandem-axle whereby at progressively lesser inflated conditions of the air-bellows the leaf-spring flexural-length exerts noticeable upward forces upon the tandem-axle and the revolvable wheels secured thereto.

In the drawing, wherein like characters refer to like parts in the several views, and in which.

Figure 1:
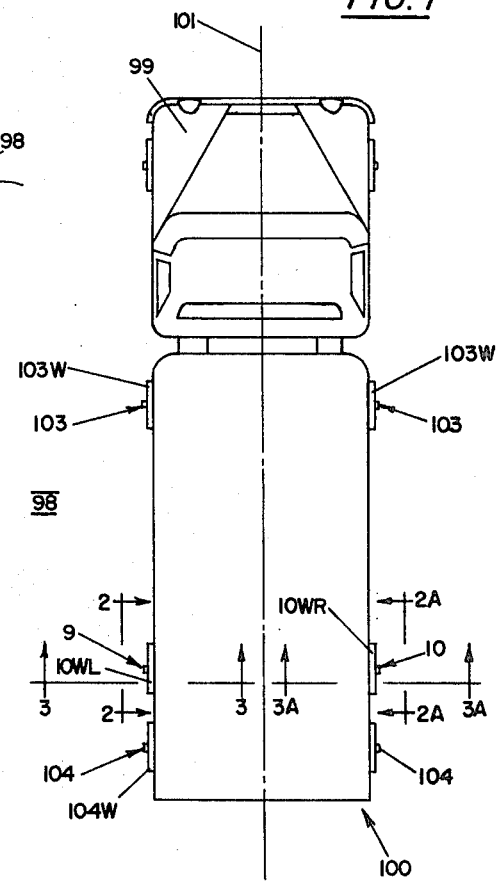
FIG. 1 is a top plan view of a typical cargo bearing overland vehicle extending longitudinally along a lengthwise-axis, said top plan view serving primarily to show a typical environment for the auxiliary retractor assembly of the present invention and to provide a basis for the following sectional views.

The teachings of the present invention are adaptable for cargo bearing vehicles generally, so long as there is included therewith at least one pneumatically suspended tandem-axle. For example, the FIG. 1 typical environment arbitrarily selected is a trailer vehicle comprising a forwardly disposed self-propelled tractor 99 adapted to pull therebehind a trailer 100 extending longitudinally along a lengthwise-axis 101. Trailer 100 herein below its horizontal floor frame 102 has three sets of axles transversely intersecting that vertical center-plane passing along lengthwise-axis 101, each of said axles being provided with at least two wheels on respective lateral sides of the center-plane for contacting a suitable underlying substrate, e.g., ground 98. For example, the trailer 100 has a basic underlying support (in original equipment form) two sets of primary-axles including front-axle 103 having rubber tires 103W and also including a rear-axle 104 having rubber wheels 104W. The third axle shown as 10 (having rubber tires 10WL and 10WR) is located between axles 103 and 104; member 10 is the tandem-axle portion of a pneumatically suspended tandem-axle assembly, herein sometimes abbreviated as PSTA or 9, that is well known in the prior art for more evenly distributing the cargo weight along the vehicle lengthwise-axis, e.g. 101.

Figure 3:
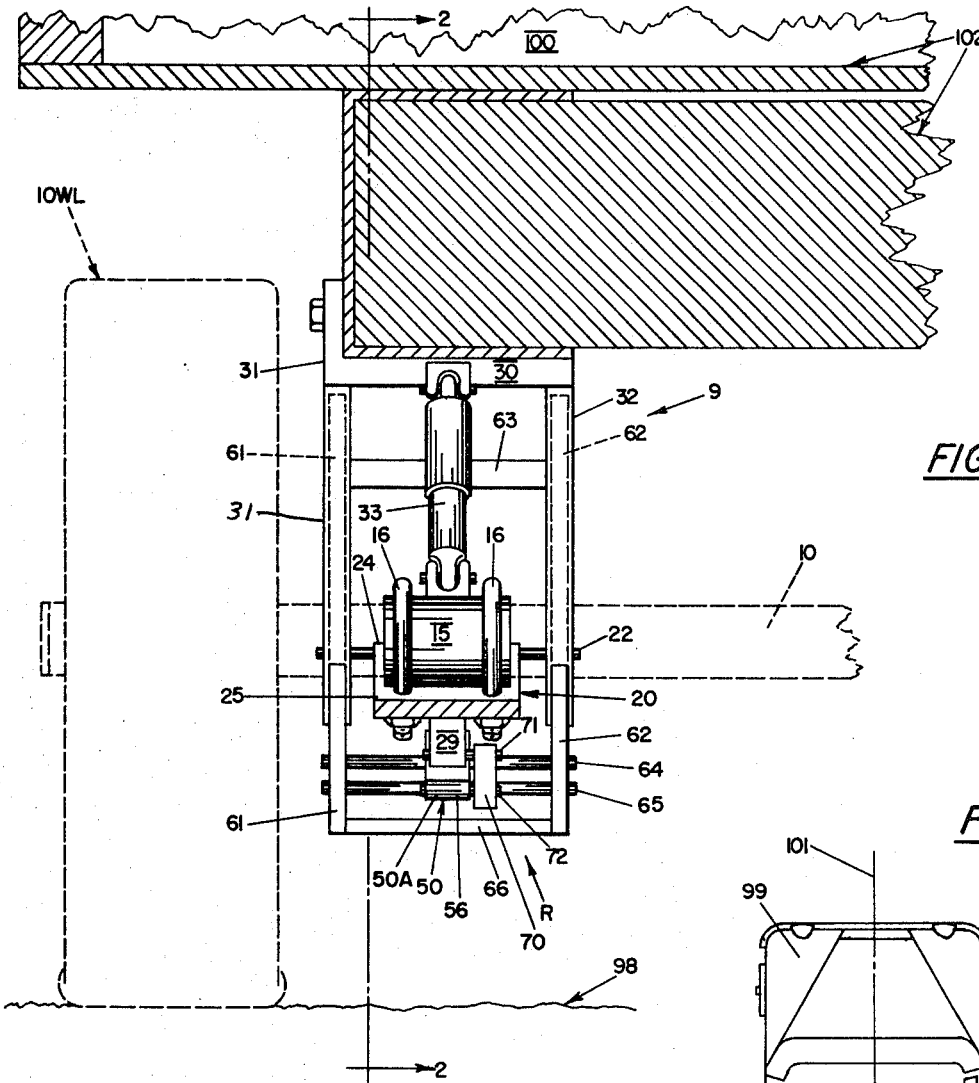
FIG. 3 is a sectional elevational view taken along line 3—3 of FIGS. 2 and 1, which is a substantial mirror image taken along line 3A—3A of FIG. 1.
Figure 2:
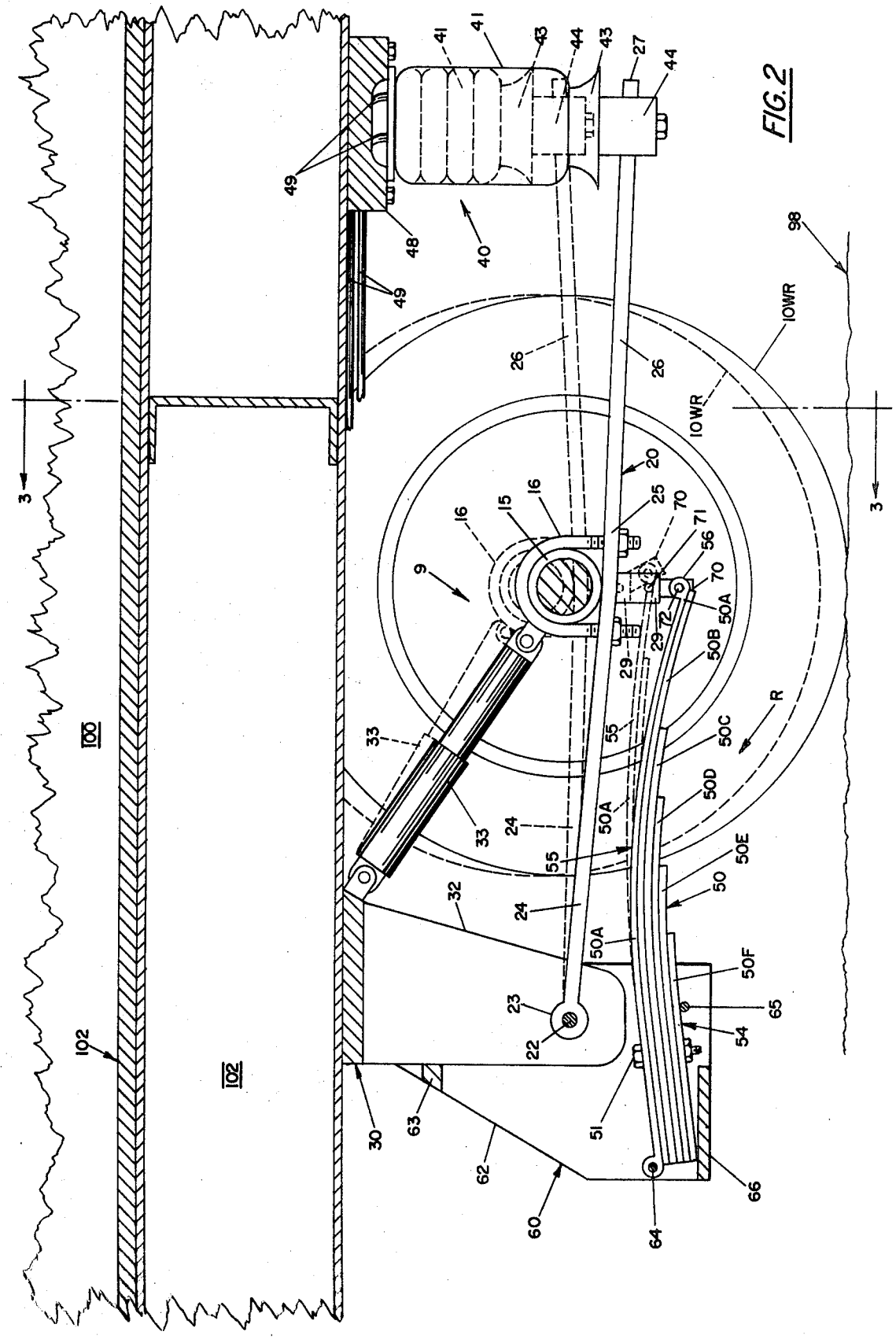
FIG. 2 is a sectional elevational view taken along lines 2—2 of FIGS. 1 and 3, FIG. 2 being a substantial mirror image of a sectional elevational view taken along line 2A—2A of FIG. 1.

Turning now to FIGS. 2 and 3 for a detailed explanation of a typical embodiment R for the auxiliary retraction assembly for the environment of traditional types of pneumatically suspended tandem-axles (PSTA). In this vein, one representative embodiment 9 of a traditional type of pneumatically suspended tandem-axle assembly (PSTA) will be described. The horizontal tandem-axle portion 10 of PSTA 9 is located below the horizontal floor frame 102 of vehicle 100 and passes transversely through a vertical center-plane extending along lengthwise-axis 101, PSTA being symmetrical with respect to said vertical center-plane as indicated with section lines 3—3 and 3A—3A. For example, PSTA 9 on both lateral sides of said center-plane includes a beam 20, a tubular collar 15, a leading frontal hanger 30, a beam fulcrum 22, an air-bellows 40, (and an auxiliary retractor R). For example, the leftward lateral side (section line 3—3) of PSTA 9 includes a longitudinally extending elongate beam 20 medially attached to tandem-axle 10, herein through a circularly tubular collar 15 located atop the beam medial portion 25 and secured thereat with a pair of U-shaped fasteners 16. Thus, axle 10 passes through a pair of said collars 15 and laterally separated by said center-plane whereby horizontal axle 10 lies between vehicle frame 102 and the underlying substrate 98. Beam 20 has two elongate portions extending in opposite longitudinal directions from its medial portion 25 including a lengthy leading (herein forward) portion 24 terminating as a forwarding leading-end 23 and also including a lengthy trailing (herein rearward) portion 26 terminating as a rearward trailing-end 27. The beam leading portion, forwardly remote of tandem-axle position 15, is supported as a fulcrum at constant elevation between the vehicle frame and the underlying substrate. Herein, the fulcrum is in the form of a pivotal connection 22 transversely extending through the beam leading portion 24(at 23) and also the two legs 31 and 32 of a bifurcate frontal hanger 30 attached in depending relationship to frame floor 102.

The gravitational-force comprising the weight of the tandem-axle 10 and collars 15 and the wheels 10WL and 10WR causes the beam to rotate downwardly about its fulcrum 22 whereby said wheels actually contact the vehicle's underlying substrate 98. Supplementing this gravitational-force, and for the purpose of ensuring that the substrate pressure of PSTA wheels 10WL and 10WR is comparable to that for primary wheels 103W and 104W, is an air-bellows 40 which is capable when inflated to exert downward pressure against the beam trailing portion 26. The air-bellows 40 is suspended from the frame floor 102 with an intervening mounter 48, and the air-bellows pneumatically downwardly extendable piston portion 43 carries a yoke 44 which is removably attached to the beam trailing portion 26 near its rearward trailing-end 27. The pneumatic pressure to air-bellows 40 is controlled from the vehicle's operator's cab 99 through tubular air-hoses 49. Whenever the operator purposely controllably inflates air-bellows 40 (typically up to 15 p.s.i.) he can increase the contact pressure between PSTA wheels 10W and underlying substrate 98, as indicated in solid line in FIG. 2. Although the air-bellows portion 40 is sometimes in the trade referred to as "an air spring" it is not capable of nor intended to provide any appreciable axle-to-frame cushioning means. Instead, traditional PSTA customarily include a separate cushioning means actuatably resiliently extending between the tandem-axle 10 and the vehicle frame 102, such as making beam 20 of a sturdy springy metal, providing a shock absorber 33, etc.

Users of traditional PSTA have long realized that whenever the vehicle is under markedly reduced or non-existent cargo load, as when the vehicle has just unloaded and is on a return trip to pick up new cargo, purposeful interim deflation of the air-bellows 40 will reduce the substrate pressure against and the wear upon the tandem-axle's rubber tires 10W. However, because of the gravitational-force comprising the weight of the tandem-axle 10 and its wheels 10W and because of the inherent stretchiness of the rubber air-bellows 40, the wheels 10W will remain in physical contact with the underlying substrate 98 even when the air-bellows is purposely deflated to atmospheric pressure. The novel auxiliary retraction assembly of the present invention is intended to automatically raise or elevate the tandem-axle wheels 10W, to prevent these these wheels from contacting the underlying substrate; this occurs when the vehicle operator has purposefully controllably deflated the air-bellows 40 to less than 5 p.s.i. The auxiliary retraction assembly for combination with traditional types of PSTA generally comprises: an elongate leaf-spring (which is wholly distinct from any cushioning means included within the PSTA) lying generally parallel to but shorter in length than the PSTA beam, the leaf-spring having a restrained-length permanently maintained at some substantially constant elevation and also having a flexural-length located nearer to the beam medial portion and that is forced to become progressively lowered and more flexed as the air-bellows is increasingly purposely inflated; the leaf-spring flexural-length is actuatably connected through an intervening uprightable connector to the medially disposed tandem-axle whereby at progressively lesser air-bellows presure the flexural-length exerts progressively greater upward forces to the tandem-axle and eventually sufficient to overcome the PSTA gravitational-force so that a spatial gap is created between the tandem-axle wheels and the underlying substrate.

A representative embodiment R of the auxiliary retraction assembly for the above generally defined traditional pneumatically suspended tandem-axle (PSTA) 9 will now be described. In describing and claiming herein the R and other embodiments for the auxiliary retraction assembly, the terms "forward" and "rearward" refer directionally longitudinally toward the "leading" (i.e., beam fulcrum) and toward the "trailing" (i.e. air-bellows) portions, respectively, of the traditional PSTA environment selected; this nomenclature is necessary because the "PSTA" is sometimes employed in longitudinal reversal, i.e., with the air-bellows being nearer to tractor 99 than is the beam fulcrum. Embodiment R generally comprises an elongate leaf-spring 50 longitudinally shorter than beam 20 and includes a relatively rigid inflexible restrained-length 54 and a more resiliently deformable flexural-length 55, the flexural-length remote of the restrained-length providing the leaf-spring free-end 56 located adjacent the tandem-axle, a bracket 60 attached to hanger 30 as a means for maintaining the leaf-spring entire restrained-length 54 a constant distance from the beam fulcrum 22, and an uprightable connector 70 actuatably extending from the leaf-spring flexural-length 55 to the tandem-axle 10. Thus, the retraction assembly R comprises elements wholly distinct and separate from the air-bellows 40 and conventional axle-to-frame cushioning means, e.g., 33.

Leaf-spring 50 comprises a plural number (e.g., six) springy leaves, the six leaves (50A–50F) being securely held together with a bolt type fastener 51 at the restrained-length 54, said restraint 51 being remote of the flexural-length 55. The four lower leaves 50C–50F are of progressively shorter longitudinally extending lengths whereby the flexural-length at the leaf-spring rearwardly trailing free-end 56 is herein provided only by the two upper leaves 50A and 50B.

It is important that during progressively inflated conditions for the air-bellows the leaf-spring flexural-length be markedly more flexurally affected than is the restrained-length. In this vein, the entire restrained-length desireably remains rigidly positioned with respect to the beam fulcrum. This might be accomplished, for example, by rigidly supporting the leaf-spring restrained-length within a bifurcate bracket 60 which can be rigidly attached in depending relationship to front hanger 30. Bracket 60 might be a unitary structure comprising a pair of upright plates 61 and 62 rigidly held together in parallel relationship with spacers 63 and 66, plates 61–62 being herein contoured for and weldably attached to the respective hanger legs 31 and 32. If the retraction assembly is to be provided as an addendum accessory for an already existant PSTA, bracket plates 61–62 might be larger than shown in the drawing, thus amenable to cutting and fitting for the hanger 30 specifically encountered. A rearward portion of the leaf-spring restrained-length portion 54 rests upon a rod 65 and the forward rolled-eye extremity of leaf 50A circularly surrounds a rod 64, transverse rods 64 and 65 each passing through the upright metallic plates 61 and 62.

The leaf-spring vertically movable terminus or free-end 56 is located between air-bellows 40 and beam fulcrum 22 and substantially in vertical alignment with tandem-axle 10. Herein, the flexural-length 55 trails longitudinally rearwardly from restrained-length 54 and bracket 60, the entire leaf-spring 50 being substantially parallel to and below beam 20. For the up-right connector actuatably extending between the leaf-spring flexural-length and the beam medial portion, a sturdy pivotal link 70 is preferred wherein a lower portion is attached to flexural-length 55 and an upper portion is pivotably associated at the beam. As seen in the drawing, the trailing (herein rearward) free-end terminus of leaf-spring 50 comprises a rolled-eye extremity of leaf 50A, transverse pivot pin 72 extending through said rolled-eye 56 and the pivotal link lower portion. Another transverse pivot pin 71 extends through the pivotal link upper portion and a lug 29, which lug is affirmatively attached (as by welding) to the underside of the beam medial portion 25. Thus, referring to FIG. 3 and the solid lines thereof, when air-bellows 40 is inflated to the typical order of about 15 p.s.i. the tandem-axle wheels 10WL and 10WR firmly contact underlying substrate 98; moreover, leaf-spring 50 including uppermost leaf 50A at flexural-length 55 becomes very highly downwardly flexed by virtue of pneumatic pressure 40. However, as indicated by phantom line in FIG. 3, whenever the operator purposely drastically reduces the air-bellows pressure, the downward flexural stress on resilient flexural-length 55 is able to exert sufficient upward pressure through pivotal link 70 to overcome the gravitational-force. Specifically, the upwardly returning leaf-spring 50 forcefully automatically creates a spatial gap between substrate 98 and tandem-axle wheels 10W whenever the air-bellows pressure is purposely reduced by some 10 to 15 p.s.i. and to about 0 to 5 p.s.i.

For vehicles having an already existent pneumatically supended tandem-axle 9, the auxiliary retraction assembly R (such as comprising bracket 60, leaf-spring 50, pivotal link 70, and lug 29) might be utilized as an addendum accessory. The method for installing a said accessory would involve simply fitting and attaching (as by welding, etc.) the bracket 60 to the existent PSTA hanger 30; also, the lug 29 would be attached (as by welding, etc.) to the beam medial portion underside.

From the foregoing, the construction and operation of the auxiliary retraction assembly will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

I claim:

1. In combination with a longitudinally extending overland vehicle including at least one transversely extending tandem-axle of a pneumatically suspended type and adapted to carry revolvable depending wheels, said tandem-axle environments comprising on each lateral side of the vehicle lengthwise-axis an elongate longitudinally extending beam medially attached to the tandem-axle and having the beam elongate leading portion pivotably supported at a constant elevation fulcrum through a hanger member depending from the vehicle frame whereby the gravitational-force comprising the weight of the tandem-axle and attached wheels causes the beam to move sufficiently downwardly that said wheels actually contact the underlying substrate, and air-bellows depending from the vehicle frame to the beam elongate trailing portion so as to increase the contact pressure between the tandem-axle wheels and substrate as the air-bellows is purposely controllably inflated, the improvement of an auxiliary retraction apparatus for overcoming the said gravitational-force whenever the air-bellows pneumatic pressure is purposely drastically reduced whereby a spatial gap is created between the tandem-axle wheels and the underlying substrate, said auxiliary retraction assembly being wholly distinct from the air-bellows and any other axle-to-frame cushioning means and further comprising: a longitudinally extending leaf-spring including an elongate restrained-length and also including an elongate flexural-length portion terminating as a leaf-spring free-end vertically offset from the tandem-axle and located between the fulcrum and air-bellows, the leaf-spring flexural-length being actuatably associated with the tandem-axle through an upright connector whereby the leaf-spring free-end terminus is forced to progressively lower elevations as the air-bellows pneumatic pressure is purposely increased, the restrained-length being rigidly associated at substantially constant elevation with the vehicle frame so as to be relatively unaffected by the air-bellows pressure and the leaf-spring through the upright connector is capable of upwardly raising the tandem-axle and attached wheels away from the underlying substrate.

2. The auxiliary retraction assembly combination of claim 1 wherein the leaf-spring restrained-length is the nearer portion to the hanger member and fulcrum whereby the leaf-spring flexural-length portion trails therefrom and is the nearer leaf-spring portion to the air-bellows; and wherein the leaf-spring has sufficient resiliency to move upwardly and overcoming said gravitational-force whenever the air-bellows pneumatic pressure is decreased by some 10 to 15 p.s.i.

3. The combination of claim 2 wherein there is a bracket attached in depending relationship to the hanger member, the leaf-spring restrained-length being rigidly attached to said bracket and being located wholly below the beam fulcrum, the leaf-spring trailing flexural-length portion being located below the beam leading portion whereby the leaf-spring free-end is located vertically below the beam medial portion; and wherein the upright connector is a pivotal link having its lower portion attached to the leaf-spring near its free-end and having its upper portion pivotably associated with respect to the beam medial portion.

4. The combination of claim 3 wherein the leaf-spring comprises a plural finite number of normally springy horizontal leaves all laminarly rigidly held together solely at the restrained-length; and wherein the attachment of the leaf-spring restrained-length to the bracket comprises an affirmative attachment to the uppermost leaf and also an abutment means located nearer to the flexural-length for the lowermost leaf to rest upon.

5. The combination of claim 4 wherein the uppermost leaf is longitudinally lengthier than the lowermost leaf, said uppermost leaf at the laminar leaf-spring free-end being of a rolled-eye form; wherein the lower portion of the upright connector pivotal link is pivotably attached to the uppermost leaf rolled-eye terminus; wherein there is a transversely extending tubular collar carried upon the beam medial portion whereby said collar is adapted to surround the tandem-axle; and wherein the upper portion of the upright connector pivotal link is pivotably connected to a lug carried by the underside of the beam medial portion and below said tubular collar.

6. The combination of claim 5 wherein the depending hanger member is bifurcate comprising a pair of vertical legs spaced on opposite lateral sides of the beam leading portion, the beam fulcrum passing transversely through the hanger legs and the intervening beam leading portion; and wherein the bracket comprises a pair of rigidly laterally spaced apart vertical plates and enclosing therebetween the leaf-spring restrained-length whereby the leaf-spring flexural-length extends in trailing fashion from the bracket; and wherein the respective bracket plates are attached in depending relationship to the respective hanger legs.

7. An auxiliary retraction assembly adapted to be installed as an addendum accessory onto an overland vehicle tandem-axle of the pneumatically suspended type, said pneumatically suspended tandem-axle environments comprising on each lateral side of the vehicle lengthwise-axis an elongate longitudinally extending beam medially attached to the transversely extending tandem-axle and having the beam elongate leading portion supported at a constant elevation fulcrum through a hanger member depending from the vehicle frame whereby the tandem-axle wheels actually contact the underlying substrate, and pneumatically inflatable air-bellows depending from the vehicle frame to the beam trailing portion so as to control the contact pressure between the wheels and the underlying substrate, said auxiliary retraction assembly being capable of automatically creating a finite spatial gap between the tandem-axle wheels and the substrate whenever the air-bellows pneumatic pressure is purposely drastically reduced by at least ten psi and comprising: a bracket attachable in depending relationship to the said hanger; a longitudinally extending leaf-spring of the plural leaves laminar type and having a less flexible restrained-length portion attached to said bracket and also having a more flexible flexural-length portion trailing from the bracket; and a pivotal link connector having its lower portion attached to the leaf-spring flexural-length remote of said bracket and having its upper portion pivotably attached to a lug adapted to be secured to the medial portion of the beam.

8. The auxiliary retraction assembly addendum accessory of claim 7 for the environment wherein the hanger member comprises two depending legs with the beam leading portion positioned therebetween: wherein the bracket comprises a pair of rigidly laterally spaced apart vertical plates and enclosing therebetween the leaf-spring restrained-length; wherein the leaf-spring restrained-length at the uppermost leaf is attached to both bracket plates, said uppermost leaf having a rolled-eye terminus at the leaf-spring flexural-length free-end, the lowermost leaf of the restrained-length portion resting against an abutment means extending transversely between the bracket plates; and wherein the pivotal link connector lower portion is pivotably attached to the rolled-eye trailing terminus of the leaf-spring.

* * * * *